United States Patent [19]

Findley

[11] Patent Number: 4,731,249

[45] Date of Patent: Mar. 15, 1988

[54] ANIMAL FEED BLOCK PACKAGE AND METHOD

[75] Inventor: John E. Findley, Claremont, Calif.

[73] Assignee: Pacific Kenyon Corp., Long Beach, Calif.

[21] Appl. No.: 869,222

[22] Filed: Jun. 2, 1986

Related U.S. Application Data

[63] Continuation-in-part of Ser. No. 771,603, Sep. 3, 1985, abandoned.

[51] Int. Cl.$^4$ .............................................. A23K 1/22
[52] U.S. Cl. ........................................ 426/69; 426/74; 426/138; 426/515; 426/630; 426/658; 426/807
[58] Field of Search ................... 426/106, 74, 138, 69, 426/139, 515, 623, 630, 658, 807

[56] References Cited

U.S. PATENT DOCUMENTS 3,275,454  9/1966  Winterberg ........................ 426/310
3,420,672  1/1969  Appleman .......................... 426/635
4,027,043  5/1977  Schroeder et al. ................... 426/69

OTHER PUBLICATIONS

Modern Packaging Encyclopedia–Jul. 1971, pp. 138–139, McGraw Hill Publishers.
Modern Plastics Encyclopedia, Oct. 1971, p. 204.

Primary Examiner—R. B. Penland
Attorney, Agent, or Firm—Robert E. Strauss

[57] ABSTRACT

There is disclosed a packaging method, and package, for animal feed supplement blocks. The packaging method comprises pouring a chemically hardening feed supplement mixture into a mold lined with a bag formed of a water soluble plastic, preferably polyvinyl alcohol. The top edges of the plastic bag are folded against the surface of the liquid mixture in the mold, and an adhesively backed label can be applied over the folded edges. The mold is bottomless, so that it can be readily stripped after the supplement mixture has solidified into a block. The resultant package greatly increases the storage life of the block as it substantially reduces moisture loss and eliminates mold growth. The package is a very attractive, glossy surfaced product, and the color and appearance of the block can be observed through the glossy transparent plastic film. As the plastic film is water soluble and digestible, it does not present any hazard to cattle in the event it is eaten by the cattle.

19 Claims, No Drawings

ANIMAL FEED BLOCK PACKAGE AND METHOD

RELATION TO OTHER APPLICATIONS

This application is a continuation-in-part of my parent application, Ser. No. 771,603, filed Sept. 3, 1985, now abandoned.

BACKGROUND OF THE INVENTION

1. Field of Invention

This invention relates to an animal feed supplement and, in particular, to a preservative coating for a solid animal feed supplement, and a method of packaging the solid supplement.

2. Brief Statement of the Prior Art

Molasses has been used for many years as an animal feed supplement together with additives such as phosphoric acid and feed nutrients such as urea, fats, and the like. Solid materials such as cottonseed meal have also been suspended in the molasses; however, difficulties have been experienced with maintaining a stable suspension of solid materials. The liquid materials have been fed by application to fodder or by free choice feeding on lick-wheels.

Feed supplements have also been manufactured and marketed as solid blocks. The earliest blocks were pressed blocks which were formed by compressing mixtures of molasses and dry feed ingredients. Poured blocks in which the ingredients are mixed with molasses and poured into cardboard cartons where they solidify are more recent developments. The earliest commercial poured block was prepared by evaporative heating of the molasses similar to candy manufacturing as described in U.S. Pat. No. 3,961,081. This block lacked water resistance, and melted at elevated storage temperatures.

The most recent advances in supplement have been the poured chemical blocks, in which additives are used to gel molasses and form water-resistance solids. Large amounts of calcium oxide or magnesium oxide have been added to molasses and the mixtures have been heated to form solid supplements in the manner described in New Zealand Patent Specification No. 170,505.

Entirely chemically gelled and hardened poured blocks and their manufacture are described in U.S. Pat. Nos. 4,027,043, 4,160,041 and 4,431,675. These blocks are prepared by the reaction of molasses, a soluble phosphate and the oxide or soluble salt of calcium and/or magnesium. No heating is required and the liquid mixture is poured into cardboard cartons for solidification. Maximum hardness is attained by using both calcium and magnesium oxides.

Another method of manufacture of a poured block is described in U.S. Pat. Nos. 4,171,385 and 4,171,386 in which the molasses is gelled with clay which is added with high shear agitation. Magnesium oxide is added to the liquid mixture and the hardness of the block can be increased by the addition of ferrous sulfate, as described in U.S. Pat. No. 4,265,916.

These products are intended for free choice or managed feeding. Unfortunately, all the aforementioned supplement blocks are affected to some degree by the environment. Usually the blocks lose from 1 to about 5 weight percent moisture in the few days immediately following their manufacture. In hot, dry climates, further loss of water can occur, to the extent that the blocks shrink and crack, resulting in an unattractive appearance. When exposed to elevated storage temperatures and high humidity, mold can also develop on the surface of the blocks, usually starting at the surface interface between the cardboard box and the block.

BRIEF STATEMENT OF THE INVENTION

This invention comprises a preservative coating for a solid animal feed supplement and a method for packaging the solid supplement. The invention comprises pouring the liquid block ingredients into a container formed of a thin film of a water soluble plastic. Surprisingly, it has been found that the liquid feed mixture can be poured directly into a container of a water soluble plastic before it solidifies into blocks and the container will retain the liquid until it solidifies.

The solidification of commercial feed solutions of sugars or proteins or mixtures thereof for the block can be achieved by any of the various techniques. The preferred technique involves the addition of solidifying ingredients which include one or both of magnesium or calcium oxides or hydroxides, and a soluble sulfate or phosphate, preferably phosphoric or sulfuric acid.

The container of a water soluble plastic is a preformed bag with a wall thickness from 0.5 to about 10 mils, preferably from 1 to about 5 mils. The liquid mixture of ingredients is poured into the plastic bag which can be supported in a surrounding mold that is removed after the ingredients have solidified. The size of the mold can be varied over wide limits, from 1 to about 750 pounds, to prepare the most convenient feeding size for the particular application. Small, individual blocks, each weighing from 1 to about 5 pounds can be prepared for a single day feeding of an individual animal. Alternatively, large blocks from 20 to about 750 pounds can be prepared for free-choice feeding by a number of animals. The block market is typically supplied with blocks of 40 to 60 pounds, 250 pounds, and 500 pounds, each, and such sizes are also preferred when using the plastic film packaging of this invention.

While the preferred solidification additives are calcium oxide or hydroxide and phosphoric acid, with or without magnesium oxide, solid blocks can also be obtained with other additives. Examples of other solidification additives include magnesium oxide, alone, when used in amounts of at least 10 weight percent of the sugar solution and when the resultant mixture is heated to a temperature of at least 135° F. Another solidification technique is the use of high contents, e.g., from 8 to 25 weight percent lime or calcium hydroxide.

Another solidification technique is to disperse about 0.5 to 5.0 weight percent of a water absorbent clay, such as attapulgite, into the sugar solution with a phosphorus source such as ammonium or sodium polyphosphate, and then add from 1 to about 10 weight percent magnesium oxide.

Regardless of which solidification additives are used, other feed ingredients can be included in the liquid mixture before it is poured into the plastic film container. Examples of these feed ingredients include a source of protein in an amount from 1 to about 35 weight percent. Protein sources include natural protein feeds such as soybean meal, cottonseed meal, rape seed meal, sunflower seed meal, corn gluten meal, etc. which contain proteins at relatively high concentrations, e.g., from 10 to about 35 weight percent. Lower grade protein sources such as ground rice hulls, ground oat hulls, ground almond shells, ground walnut shells, etc. can also be used, as well as ground or cracked grains, e.g., cracked corn, oats, etc. For ruminants, equivalent protein sources can be used such as urea, biurea, and ammonium salts, alone, or in admixture with the aforementioned natural proteins. Also, products rich in "by-pass" protein can also be used such as bloodmeal, feather meal, etc. These are relatively high in protein content, from about 75 to 90 percent protein and are used at lower contents in the block mixture, e.g., from about 1 to about 10 weight percent.

Other ingredients which can be incorporated in the blocks include fat from an animal or plant source in an amount from about 0 to 20 percent. Examples of useful fats include tallow and fatty acids which are byproducts of rendering plants, and food processing plants and restaurants, as well as vegetable oils and fats such as linseed oil, cottonseed oil, soy oil, etc. Vitamins such as vitamin A, D, E can be included, as well as various minerals.

THE FEED SUPPLEMENT

The feed supplements which are used for practice of this invention, in general, have the composition set forth in the following table:

TABLE 1

| Ingredient | Proportions, Weight Percent | |
|---|---|---|
| | Broad | Preferred |
| Feed solution | 30–95 | 50–80 |
| Solidifying Ingredients: | 2–20 | 4–10 |
| Protein or Non-protein nitrogen* | 0–40 | 5–20 |
| Fat | 0–30 | 0–20 |
| Vitamins | 0–3 | 0.1–2 |
| Minerals | 0–40 | 0.1–2 |

*Expressed as weight percent of equivalent protein.

These supplements contain from 10 to 35 percent water, preferably from 15 to 28 percent water. Water is a component of the above ingredients such as the feed solutions. Where necessary, water can also be added as an ingredient to obtain the desired water content in the final supplement.

The content of minerals, phosphorus and calcium, as well as other ingredients such as drugs, vitamins, etc., can be varied as desired for specific applications. Examples of various minerals are manganese, iodine, zinc, copper, cobalt and iron compounds. In some specific applications, a high content mineral supplement is desirable, e.g., containing from 6 to 10 percent phosphorus, 5 to 8 percent calcium and from 0.1 to 2 percent of mineral salts, added as finely divided powders. These salts can be water insoluble salts such as dicalcium and tricalcium phosphate or can be water soluble salts such as monoammonium phosphate. Examples of vitamins include Vitamin A, Vitamin D, and Vitamin E.

Examples of useful drugs are: growth promoting food additives or drugs such as monensin and sodium monensin, commercially available under the designation Rumensin for Eli Lilly Co.; chlortetracyline and sulfamethiazine; and mixtures of chlortetracyline and sulfamethiazine; etc. Other useful drugs include antibloat and antihelmintic agents as well as insect control agents. The aforementioned materials are used in effective concentrations for the desired result, e.g., drugs are used at concentrations from 0.5 to about 1.0 weight percent. The minerals are usually used in similar concentrations, but are often expressed in amounts from 3 to about 500 milligrams per pound and vitamins are frequently expressed from 10 to about 50,000 units per pound.

The preferred feed supplement is solidified with solidifying ingredients comprising calcium or magnesium oxides, or hydroxides, or mixtures thereof and a soluble phosphate or sulfate. The following table summarizes the composition of the preferred feed supplement:

TABLE 2

| Ingredient | Proportion, Weight Percent | |
|---|---|---|
| | Broad | Preferred |
| Feed solution | 30–95 | 50–80 |
| Sulfate or Phosphate* | 1–8 | 3–5 |
| Calcium** | 1–8 | 2–5 |
| Magnesium** | 3–10 | 4–7 |
| Total Water | 10–35 | 15–28 |
| Protein or Non-protein nitrogen*** | 0–40 | 5–20 |
| Fat | 0–30 | 0–20 |
| Vitamins | 0–3 | 0.1–2 |
| Minerals | 0–40 | 0.1–2 |

*Expressed as $SO_4$ or $P_2O_5$
**Expressed as oxides.
***Expressed as weight percent of equivalent protein.

THE FILM COATING

The block are surrounded by a film of a water soluble plastic such as polyvinyl alcohol, polyvinyl acetate, ethylene-vinyl acetate copolymers, and alkyl cellulose esters. These films are edible. Of the aforementioned, films of polyvinyl alcohol are preferred as these are generally recognized as safe packaging materials for food products. As desired, or necessary, the polyvinyl alcohol can be strengthened by the inclusion of from 5 to about 40 weight percent glycerol. Films of polyvinyl alcohol will slowly dissolve in water at ambient temperatures and will rapidly dissolve at temperatures of 150° F. or greater. Despite this solubility, we have found that the liquid mixture of ingredients can be poured into and retained in containers of the plastic at elevated temperatures. This permits the use of these containers to package the supplements which are poured into the containers at the elevated temperatures experienced during their preparation, which for most supplement formulations, is from 110° to 135° F. Although the supplement mixtures are aqueous suspensions and are poured into the plastic containers at such elevated temperatures, the plastic containers will retain the supplements. After the supplements solidify, the plastic film containers protect the supplement by retaining moisture and preventing growth of mold.

A microcide and/or insecticide ingredient can be included in the plastic film. This can be an ingredient having a specific activity for the particular microorganism which is to be controlled, including bactericides and fungicides. The microcide is included at an effective concentration which is preselected for each specific microcide and is generally from about 0.0001 to about 2 weight percent. Examples of suitable microcides include the following:

Fungicides: organic acids such as the $C_2$ to about $C_8$ alkanoic, alkenoic, and alkdienoic mono and dicarboxylic acids including acetic, propionic, butyric, valeric, isobutyric, 2-ethylbutyric, oxalic, malonic, succinic, glutaric, adipic, pimelic, maleic and sorbic acids, and their alkali metal salts, etc.; aromatic and wood acids such as benzoic, ethylbenzoic; pyroligneous acids, and their alkali metal salts, etc.; iodine; mercuric chloride; alkali metal bisulfides, e.g., sodium bisulfide; phenol;

hexachloroprene; formaldehyde; gentian violet; antibiotic compounds such as Delvocid, a fungicidal tetraene having the empirical formula $C_{33}H_{47}NO_{13}$; etc.

Bactericides such as sodium bisulfite, iodine, mercuric chloride, phenol, hexachloroprene, formaldehyde, quaternary ammonium compounds, peroxides, etc.

Insecticides which can be used include those which are useful in animal feeds, i.e., those which are not toxic to the animal and which will not result in any harmful or objectionable residue in the raw agricultural commodity obtained from the animals. Examples of such insecticides are: sulfur, lime/sulfur, Methosychlor, Ronnel, phenothiazine, Rabon, etc.

Additionally, a flavoring additive can also be included in the plastic film to improve the appearance and palatability of the solid supplement. Examples of suitable flavoring additives are: anise, apple flavoring, caramel flavor, molasses flavoring, etc.

The plastic film has a thickness from about 0.1 to about 10 mils, preferably from about 0.5 to about 5 mils, and most preferably from 1 to about 3 mils. This will be from 0.05 to about 5 grams, preferably from 0.1 to about 20, most preferably from 0.5 to 5 grams, per square foot of surface area of the block. The film is preformed into a bag and the bag is preferrably supported in a rigid mold to impart uniform size and shape to the finished block products.

THE FEED SOLUTION

The animal feed supplement is prepared from a commercial aqueous feed solution. Generally, this will be a sugar solution, and a variety of sugar solutions can be used; however, molasses is a preferred source. The feed solution should be present in the feed supplement at a concentration of from 30 to about 95, preferably from 50 to about 80, weight percent. The preferred molasses source is commercially available with a sugar content from about 65 to 85 Brix and a consistency that varies from a thin to a thick syrup. The water content of these solutions is from 5 to about 30 weight percent. The molasses can be any sugar containing molasses such as cane or Blackstrap Molasses, beet molasses, converted molasses wood sugar molasses, hydrosyrup, citrus molasses and the like.

Another sugar solution that can be used is whey, a by-product of the diary industry. The whey is a dilute solution of lactoalbumin, lactose, some fats, and the soluble inorganics from the parent milk. This whey solution is condensed and spray dried to a powder or is condensed to about 40 to 60 percent solids and preserved. A typical analysis is as follows:

TABLE 3

| Composition of a Typical Dried Whey | |
| --- | --- |
| Protein | 12.0% |
| Fat | 0.7% |
| Lactose | 60.0% |
| Phosphorous | 0.79% |
| Calcium | 0.87% |
| Ash | 9.7% |

A third source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:

Ammonium lignin sulfonate;
Sodium lignin sulfonate; and
Magnesium lignin sulfonate.

A typical analysis of a commercially available ammonium lignin sulfonate solution is as follows:

TABLE 4

| Typical Analysis of Ammonium Lignin Sulfonate | |
| --- | --- |
| Percent Solids | 50% |
| Specific gravity | 1.237 |
| pH, 10% solution | 3.5 |
| Sugars - expressed as glucose | 16.0% |
| Tannin content | 45.0% |
| Available ammonia | 3.0% |
| Sulfur | 6.0% |
| Ash | 1.0% |

The sugar solution is the energy source ingredient of the supplement. Sources of other metabolizable organic values can be used to replace a portion of the sugar solutions. Examples of such other useful energy ingredients sources include condensed and dehydrated molasses solubles which are obtained from the fermentation of molasses to produce chemicals such as ethanol, ctric acid, glutamic acid, etc. A material rich in metabolizable values, known as condensed molasses solubles, is obtained by evaporation of the residue from this fermentation. This material can also be dehydrated to dryness and the resultant dry solid is also a useful additive. Another very useful feed solution is a condensed or concentrated fermented corn extract, which is sometimes referred to as corn steep liquor or mazoferm. This material is obtained by concentrating the liquid remaining after steeping corn in an aqueous sulfur dioxide solution and allowing it to ferment. These materials can have from 40 to 100 percent solids (the balance being water) and can contain, on a dry weight basis, from 1 to 15 percent sugar and contain significant contents of protein, e.g., from 5 to about 25 percent. All, or any portion of the aforementioned sugar solutions can be replaced with these feed solutions, depending on the amount of natural protein which is desired in the final supplement.

THE SULFATE OR PHOSPHATE INGREDIENT

The sulfate or phosphate which can be employed as a solidifying component in the feed supplement can be phosphoric or sulfuric acid or any soluble salt thereof with the acids being preferred. Mixtures of the sulfate and phosphate can also be used in proportions of from 10 to 90 percent of either sulfate or phosphate. Examples of useful sulfates or phosphates include the alkali metal and ammonium salts, e.g., sodium sulfate, sodium phosphate, potassium sulfate, potassium phosphate, ammonium sulfate or ammonium phosphate. The preferred ingredient is sulfuric or phosphoric acid which can be of any commercially available grade from 50 to 98 percent acid. When using sulfuric acid the acid preferably is diluted to a concentration range of from 50 to about 75 weight percent to avoid excessive temperatures during its addition to the liquid ingredients. The sulfate or phosphate is employed in the sugar solution at a concentration from about 1.0 to about 8.0, preferably from 2.0 to about 5.0 weight percent, expressed as $SO_4$ or $P_2O_5$

THE CALCIUM INGREDIENT

One of the solidifying components of the composition can be calcium oxide or hydroxide. Commercially available lime, calcium oxide, is useful in finely subdivided form, typically 90 weight percent or more passing a 125 mesh screen. The more finely subdivided the lime, the faster that it will hydrate and participate in the solidification of the supplement. The lime can be slaked by mixing with water prior to addition to the sugar solution, or if desired, can be added directly to the aqueous sugar solution, depending on the process equipment and controls. The amount of the calcium oxide or hydroxide ingredient which is employed can be from 1.0 to about 8.0 weight percent, expressed as the oxide, and preferably is from about 3.0 to about 5.0 weight percent based on the weight of the sugar solution.

THE MAGNESIUM OXIDE INGREDIENT

The other solidifying solid additive is finely subdivided magnesium oxide in an amount from 2 to about 15 weight percent, preferably from 3 to about 10 weight percent. This quantity of magnesium is also useful for increasing milk production of dairy cattle and for preventing grass tetany and acidosis in cattle. The magnesium oxide should be finely subdivided, at least 90 weight percent passing a 100 mesh screen, preferably all passing a 325 mesh screen. Preferably the magnesium oxide has an activity of from 5 to about 65 seconds when measured in a standard activity test (citric acid test).

THE PROTEIN SOURCE

The feed supplement can also contain a nitrogen source for the animal's protein requirements. The nitrogen can be in proteins which are commonly found in various sources such as: dried blood and meat meal from rendering plants, cottonseed meal, soy meal, rape seed meal, sunflower seed meal, dehydrated alfalfa, dried and sterilized animal and poultry manure, fish meal, liquid or powdered egg, fish solubles, cell cream and rabbit pellets. When the feed supplement is intended for consumption by ruminants, a non-protein nitrogen compound such as ammoniacal compounds, e.g., urea, biuret or mono- or di-ammonium phosphates can be used to supplement the protein requirements. The preferred non-protein nitrogen source is urea which can be added in an amount from 2 to about 15 weight percent, preferably from 5 to 12 weight percent, based on the supplement. In some applications, it is preferred to use all "natural" protein, and in such instances, a vegetable meal such as cottonseed meal, soy meal, rape seed meal, corn gluten meal, etc. can be used.

The following examples illustrate practice of the invention and will serve to demonstrate results obtainable therewith. In the examples, molasses of commercial quality (79.5 Brix) is used.

EXAMPLE 1

A feed supplement is prepared by mixing together the following ingredients:

TABLE 5

| Ingredient | Weight Percent |
| --- | --- |
| Molasses: | 36 |
| Sodium pyrophosphate | 2 |
| Attapulgite clay | 2 |
| Urea | 6 |
| Calcium carbonate | 3 |
| Soybean meal | 6 |
| Tallow | 3 |
| Sodium Chloride | 3 |
| Water | 16 |
| Ground Oat Hulls | 20 |

TABLE 5-continued

| Ingredient | Weight Percent |
| --- | --- |
| Magnesium Oxide | 3 |

The ingredients are mixed in a high shear mixer with a blade tip speed of about 4500 feed per minute. The clay and water are first dispersed in the molasses, then the phosphate, urea, calcium carbonate and sodium chloride are added. The soybean meal and ground oat hulls are added next, then the magnesium oxide and the fat. The resultant mixture is stirred for ten minutes and is then poured into plastic bags formed of polyvinyl alcohol having a wall thickness of 0.002 inch. These plastic bags are retained in bottomless, cylindrical sidewall molds. The mixture is at a temperature of 118° F. at the time it is poured into plastic bags within the molds. After filling, the sides of the plastic bags are folded over and pressed against the top liquid surface. The folded sides are covered with an adhesively backed label.

The molds are stored for eight hours and then inspected to determine that the ingredients have solidified into hard solids. The cylindrical sidewall molds are then removed to recover dark brown, glossy surfaced cylinders of feed supplement blocks, each weighing about 500 pounds, suitable for marketing. Because the blocks were formed by pouring the liquid ingredients into the plastic film bag, the film conforms so snuggly to the surfaces of the block that it is entirely transparent, permitting the purchaser to visually inspect the blocks at time of purchase.

EXAMPLE 2

A feed supplement is prepared by preheating molasses to a temperature of 150° F. The preheated molasses is introduced into a mixing vessel and stirred while adding urea, magnesium oxide, calcium phosphate, salt and corn gluten meal at the following proportions:

TABLE 6

| Ingredient | Weight Percent |
| --- | --- |
| Molasses | 70 |
| Calcium Phosphate | 5 |
| Salt | 3 |
| Corn gluten meal | 10 |
| Magnesium oxide | 12 |

The supplement is maintained at 150° F. during mixing of the ingredients and is then poured directly into bottomless cylindrical molds lined with plastic bags having a wall thickness of 0.002 inch.

Each mold is formed of two halves which join along the longitudinal midline of the assembled form. The joined edges have continuous edge flanges which are clamped together to assemble the mold. The molds are made of fiberglass reinforced plastic and are surrounded by an outer jacket of polystyrene foam insulation approximately 1 inch thick.

The molds rest on a smooth surface pellet and the plastic bags are placed, one each within each mold, with the top of each bag extending above the top of its mold. Four molds are placed on each pallet and the pallet is moved to the packaging station of the block plant.

After each bag is filled, the upper end of each bag is folded closed, against the top surface of the liquid contents in the bag, and an adhesivly backed label is applied over the folds.

Each pallet, which supports four filled molds, each containing 500 pounds of block ingredients, is moved into a heated storage room, maintained at 135° F. The next morning, the blocks are moved into the warehouse, the mold clamps are released and the molds are removed, leaving four glossy surfaced molasses blocks, each weighing 500 pounds, on each pallet. The blocks are completely finished and ready for shipment.

EXAMPLE 3

A feed supplement is prepared by mixing lime with water in weight proportions of three parts water per part of lime. The temperature of the mixture rises to 195° F. as the lime hydrates. Molasses is then added, followed by the other feed ingredients. The mixture is stirred continuously while dry ingredients, which include: urea, corn gluten, dicalcium phosphate, salt and fat, are added. The following table lists the ingredients and their proportions:

TABLE 7

| Ingredient | Weight Percent |
|---|---|
| Molasses | 45 |
| Calcium oxide | 8 |
| Water | 24 |
| Corn gluten | 15 |
| Dicalcium phosphate | 3 |
| Salt | 2 |
| Fat | 2 |

The mixture thickens considerably upon the addition of the dry feed ingredients and the resultant mixture is pressed into the same molds lined with polyvinyl alcohol film bags which are described in Example 1. The feed supplements solidify in the molds in approximately four hours. The molds are then separated and removed and the resultant supplement blocks are ready for shipment.

EXAMPLE 4

The preferred feed supplement is prepared by mixing water and lime to prepare a slurry containing 33 weight percent calcium, expressed as lime. The hydration of the lime raises the slurry temperature to 190° F., and cane molasses is then added to prepare a mixture containing about 84 percent cane molasses. Dry urea and salt are then added, followed by magnesium oxide, corn gluten, and fat. The mixture is stirred for ten minutes and is then poured into bottomless molds lined with plastic bags having a 2 mil thickness. The molds have an octagonal cross section. The molds are approximately 20 inches tall and 22 inches in width, and each mold is filled with 250 pounds of supplement. The molds are stacked on a pallet with four molds on the pallet, filled and the top edges of the plastic bag in each mold are folded against the surface of the liquid contents and an adhesive label is placed over the folded edges. A plywood divider is placed over the molds and a second layer of plastic-bag-lined molds is stacked on the plywood divider and filled in the same manner.

The pallets are moved into an unheated warehouse and the temperature of the supplements monitored. When the temperatures of the supplements in the molds reach 165° F., the insulating jackets are removed from the molds. The following morning the molds are removed, leaving pallets, each supporting two layers of supplement blocks, four blocks in each layer. The blocks have a glossy appearance and appear drak brown through the transparent plastic covering.

The blocks have the following ingredients:

TABLE 8

| Ingredient | Weight Percent |
|---|---|
| Cane Molasses | 54.2 |
| Corn Gluten Meal | 14.0 |
| Water | 6.0 |
| Urea | 5.0 |
| Fat | 4.6 |
| Salt | 4.5 |
| Magnesium Oxide | 4.5 |
| Phosphoric acid (75%) | 4.0 |
| Lime | 3.0 |
| Vitamins and Trace Minerals | 0.2 |

The blocks are ready for shipment into the feed distribution system without any further treatment. They are supplied for free choice feeding by placing one or more blocks at selected locations on cattle ranges, and the outer plastic film is stripped from the blocks when they are placed on the range. Since the blocks are highly weather resistant, they withstand rains without any significant loss.

The blocks also have an extended storage life in the distribution system. The plastic outer covering is impermeable to oxygen and the blocks can be stored under high humidity conditions without developing any mold. Since the plastic outer covering also resists moisture transfer, particularly at low humidity conditions, the blocks can also be stored under hot and/or dry conditions without experiencing any significant loss of moisture and without cracking.

The invention has been described with reference to the presently preferred and illustrated embodiments. It is not intended that the invention be unduly limited by the disclosure of the preferred embodiments. Instead, it is intended that the invention be defined by the method steps, and ingredients, and their obvious equivalents set forth in the following claims.

What is claimed is:

1. In a method for the preparation of an animal feed supplement in the form of a homogeneous, single-piece block from 1 to about 750 pounds wherein an aqueous feed supplement containing sugars and proteins and from 10 to 35 weight percent water is poured into a mold at a temperature up to 150° F. and solidifies therein, the improvement comprising: lining the mold with a film with a thickness from 0.5 to about 10 mils and formed entirely of a water soluble plastic selected from the group consisting of: polyvinyl alcohol, polyvinyl acetate, ethylene-vinyl acetate copolymers and alkyl cellulose esters, permitting said supplement to solidify into a solid block and removing said mold to obtain said block sealed within a, plastic outer covering.

2. The method of claim 1 wherein said plastic is polyvinyl alcohol.

3. The method of claim 2 wherein said plastic has a thickness from 1 to about 5 mils.

4. The method of claim 1 wherein said supplement contains from 45 to 90 weight percent molasses.

5. The method of claim 4 wherein said supplement contains from 2 to 20 weight percent solidifying ingredients.

6. The method of claim 5 wherein the solidifying ingredients include from 1 to 8 percent soluble sulfate or phosphate, and from 3 to 10 weight percent magnesium oxide.

7. The method of claim 6 wherein the solidifying ingredients also include from 1 to 8 weight percent lime or calcium hydroxide.

8. The method of claim 5 wherein said supplement contains up to 40 weight percent of protein or equivalent protein.

9. The method of claim 8 wherein said supplement contains up to 30 percent fat.

10. The method of preparing an animal feed supplement in solid block form which comprises:
 (a) admixing an aqueous feed solution selected from the group consisting of aqueous solutions of sugars, proteins and mixtures thereof, with solidifying ingredients selected from the group consisting of magnesium oxide, calcium oxide, calcium hydroxide, phosphoric acid, a soluble phosphate, sulfuric acid, a soluble sulfate, and mixtures thereof, in proportions of from 45 to 95 percent aqueous feed solution and from 2 to 20 weight percent solidifying ingredients, and water as required to provide a moisture content from 10 to 35 weight percent;
 (b) placing a plastic bag formed of a water soluble plastic film having a thickness from 0.5 to 10 mils and formed of a plastic selected from the group consisting of polyvinyl alcohol, polyvinyl acetate, ethylene-vinyl acetate copolymers and alkyl cellulose esters, into a bottomless vertical-walled mold;
 (c) pouring the liquid feed supplement mixture into the plastic bag; and
 (d) storing the mold containing the feed supplement mixture to permit its contents to solidify; and
 (e) stripping the bottomless, vertical-walled mold from the resultant solid block to recover a solid block entirely covered by said plastic film.

11. The method of claim 10 wherein said feed supplement is poured into said plastic bag at a temperature from 110° to 135° F.

12. The method of claim 10 wherein said film also includes a microcide in an effective concentration from 0.0001 to about 2 weight percent.

13. The method of claim 10 wherein said mold is formed of two halves which are joined along longitudinal edges into said vertical-walled form, and said step of stripping said form from said solid block comprises the steps of separating the joined longitudinal edges of said halves and removing the from the block.

14. The method of claim 10 wherein said plastic is polyvinyl alcohol.

15. The method of claim 10 wherein said plastic has a thickness from 1 to about 5 mils.

16. The method of claim 10 wherein said feed supplement comprises a molasses block containing from 45 to 90 weight percent molasses.

17. The method of claim 10 wherein the feed supplement contains from 2 to 20 weight percent solidifying ingredients.

18. The method of claim 10 wherein the feed supplement contains up to 40 weight percent of protein or equivalent protein.

19. The method of claim 10 wherein the feed supplement contains up to 30 weight percent fat.

* * * * *